US009912385B2

(12) United States Patent
Holweg et al.

(10) Patent No.: US 9,912,385 B2
(45) Date of Patent: Mar. 6, 2018

(54) CONTACTLESS CIRCUIT ARRANGEMENT

(71) Applicant: Infineon Technologies AG, Neubiberg (DE)

(72) Inventors: Gerald Holweg, Graz (AT); Christoph Steffan, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/287,804

(22) Filed: Oct. 7, 2016

(65) Prior Publication Data

US 2017/0104515 A1 Apr. 13, 2017

(30) Foreign Application Priority Data

Oct. 8, 2015 (DE) .................. 10 2015 117 170

(51) Int. Cl.

| | |
|---|---|
| *G06K 19/06* | (2006.01) |
| *H04B 5/00* | (2006.01) |
| *G06K 7/10* | (2006.01) |
| *G06K 19/07* | (2006.01) |
| *G06K 19/077* | (2006.01) |
| *H01Q 1/22* | (2006.01) |
| *H01Q 9/04* | (2006.01) |

(52) U.S. Cl.
CPC ....... *H04B 5/0062* (2013.01); *G06K 7/10316* (2013.01); *G06K 19/0726* (2013.01); *G06K 19/07773* (2013.01); *H01Q 1/2225* (2013.01); *H01Q 9/0442* (2013.01); *H04B 5/0081* (2013.01)

(58) Field of Classification Search
CPC .. H04B 5/0062; H04B 5/0081; H01Q 1/2225; H01Q 9/0442; G06K 7/10316; G06K 19/0726; G06K 19/07773; G06K 19/0701; G06K 19/07749
USPC ......................................................... 235/492
See application file for complete search history.

(56) References Cited

U.S. PATENT DOCUMENTS

| | | | |
|---|---|---|---|
| 2006/0187049 A1* | 8/2006 | Moser ............... | G06K 19/0701 340/572.5 |
| 2007/0236336 A1* | 10/2007 | Borcherding ........ | G06K 7/0008 340/10.34 |
| 2010/0019907 A1* | 1/2010 | Shanks ............... | G06K 7/0008 340/572.5 |
| 2011/0148723 A1* | 6/2011 | Bengtsson ............ | H01Q 1/243 343/745 |
| 2012/0313762 A1* | 12/2012 | Ohshima ............. | G08C 17/00 340/10.5 |

(Continued)

FOREIGN PATENT DOCUMENTS

| | | |
|---|---|---|
| DE | 102013111027 A1 | 4/2015 |
| EP | 1042731 B1 | 10/2001 |

*Primary Examiner* — Laura Gudorf
(74) *Attorney, Agent, or Firm* — Viering, Jentschura & Partner mbB

(57) ABSTRACT

Various embodiments provide a contactless circuit arrangement. The contactless circuit arrangement includes at least one antenna, an antenna tuning circuit having a plurality of electrical components, and an energy supply interface which is connected to the antenna tuning circuit in an electrically conductive manner and is intended to supply electrical energy for electrically connecting or disconnecting at least one electrical component of the plurality of electrical components for adapting the antenna tuning circuit to a target frequency.

19 Claims, 3 Drawing Sheets

(56) References Cited

U.S. PATENT DOCUMENTS

2015/0097741 A1    4/2015   Pachler et al.
2015/0254544 A1*   9/2015   Kunc .................. H01Q 1/2208
                                                                                                 235/492

\* cited by examiner

CONTACTLESS CIRCUIT ARRANGEMENT

CROSS-REFERENCE TO RELATED APPLICATION

This application claims priority to German Patent Application Serial No. 10 2015 117 170.8, which was filed Oct. 8, 2015, and is incorporated herein by reference in its entirety.

TECHNICAL FIELD

The present disclosure relates to a contactless circuit arrangement.

BACKGROUND

In communication technology, it is critically important to tune an antenna structure to a frequency. In the event of incorrect tuning, communication may be prevented, for example, or the communication range may be greatly reduced owing to a lack of signal injection.

RFID communication technology is a wireless communication technology designed for short ranges ("proximity" or "Near Field Communication", NFC) or longer ranges ("long-range"). In this case, so-called RFID chips ("Radio Frequency IDentification") are often used. RFID communication technology is used, for example, in smartcards, payment systems, smartphones and in logistics.

In RFID communication technology, incorrect tuning may result in coupling-in of energy, for example into an RFID chip, being reduced to such an extent that an RFID communication circuit cannot be activated at all in the first place.

The transmission of data and energy according to RFID communication technology can be implemented, for example, using electromagnetic waves (in "long-range" applications) and/or using electromagnetic fields, for example using magnetic induction (in "proximity" or "NFC" applications).

In order to tune an antenna structure of an RFID communication circuit, an RFID communication circuit usually detects electromagnetic waves or fields. The RFID communication circuit then changes from an energy-saving mode to a communication mode. The antenna structure is then electrically tuned to the frequency of the electromagnetic waves or fields using a variable component.

Furthermore, an irreversible technology is also conventionally used. For example, an RFID communication circuit can be retuned by interruptions in electrically conductive connections (for example established by means of a laser) or by so-called "e-fuses" by irreversibly changing one or more properties of an electronic component. However, such tuning can no longer be changed or optimized or can be changed or optimized at least only to a reduced extent.

For example, during communication between a reader and an RFID communication circuit using electromagnetic waves or fields, the antenna structure of the RFID communication circuit cannot be tuned to the frequency of the electromagnetic waves or fields before the start of communication. When communication begins, the passive RFID communication circuit obtains energy from the electromagnetic waves or fields in order to activate at least parts of the passive RFID communication circuit in order to tune the antenna structure. That is to say, at the start of communication, it may be necessary to couple in sufficient energy using a possibly incorrectly tuned antenna structure in order to enable tuning to a target frequency. This may mean, for example, that communication cannot be initiated or can be initiated only with a short range.

SUMMARY

Various embodiments provide a contactless circuit arrangement. The contactless circuit arrangement includes at least one antenna, an antenna tuning circuit having a plurality of electrical components, and an energy supply interface which is connected to the antenna tuning circuit in an electrically conductive manner and is intended to supply electrical energy for electrically connecting or disconnecting at least one electrical component of the plurality of electrical components for adapting the antenna tuning circuit to a target frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings which form part of this description and, for the purpose of illustration, show specific embodiments in which the invention can be carried out. In this respect, direction terminology, for instance "at the top", "at the bottom", "at the front", "at the back", "front", "rear", etc., is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected", "linked" and "coupled" are used to describe both a direct and an indirect connection, a direct or indirect link and a direct or indirect coupling. In the figures, identical or similar elements are provided with identical reference symbols, insofar as this is expedient.

Figure 1:
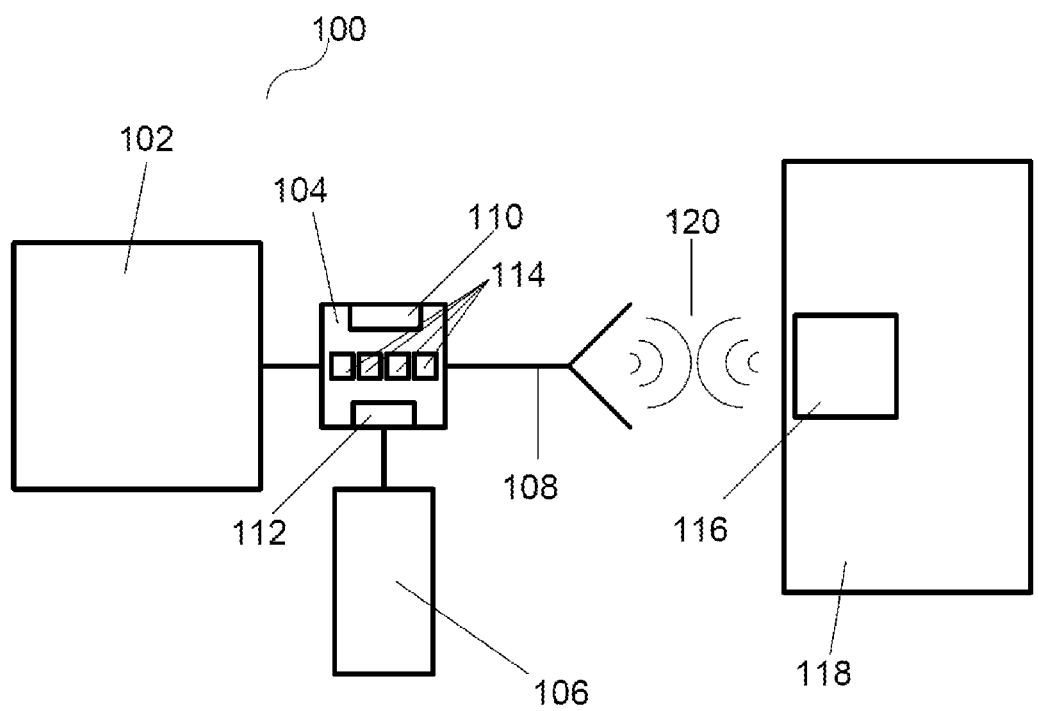
FIG. 1 shows an embodiment of a contactless circuit arrangement.

FIG. 1 schematically shows a contactless circuit arrangement 100 according to various embodiments.

The contactless circuit arrangement 100 has an RFID communication circuit 102, an antenna tuning circuit 104, an antenna 108, an energy supply interface 112 and a permanent energy storage 106. The antenna tuning circuit 104 has a memory 110 and a plurality of electrical components 114 which can be connected and disconnected.

The contactless circuit arrangement 100 communicates with a communication unit 118, which has an RFID communication device 116, according to an RFID communication technology using electromagnetic waves or fields 120. In this case, the contactless circuit arrangement 100 is supplied with energy by means of the electromagnetic waves or fields 120. The communication unit 118 is set up as a smartphone with an RFID interface as a near field communication device 116.

In one embodiment, the contactless circuit arrangement 100 communicates with a communication unit 118 by means of magnetic induction.

In various embodiments, the contactless circuit arrangement 100 may be part of a smartcard, a payment system, a smartphone or may be in a logistics device.

The RFID communication circuit 102 is connected to the antenna tuning circuit 104 in an electrically conductive manner. The antenna tuning circuit 104 is connected to the permanent energy storage 106 in an electrically conductive manner by means of the energy supply interface 112. In addition, the antenna tuning circuit 104 is connected to the antenna 108 in an electrically conductive manner.

The RFID communication circuit 102 can transmit data and energy according to an RFID communication technology (that is to say using the corresponding communication protocols according to the respectively provided RFID communication technology) using the antenna tuning circuit 104 and the antenna 108. The configuration of the plurality of electrical components 114 which can be connected and disconnected can be maintained by means of the energy supply interface 112 and the permanent energy storage 106. The memory 110 may store an item of control information which corresponds to the configuration of the plurality of electrical components 114 which can be connected and disconnected.

A conventional passive RFID tag is not supplied with energy before communication with a corresponding RFID reader. An antenna structure of the RFID tag is tuned to an electromagnetic frequency by means of a presetting. If the RFID reader initiates communication by emitting electromagnetic waves or fields, the electromagnetic waves or fields are coupled into the antenna structure of the RFID tag. Depending on the difference between the frequency of the presetting of the antenna structure and the frequency of the electromagnetic waves or fields involved in communication, there is possibly incorrect tuning. On account of this incorrect tuning, the coupling-in of the electromagnetic waves or fields can be reduced in such a manner that data and energy cannot be transmitted or can be transmitted only to a reduced extent when communication is initiated. The RFID reader must be brought very close to the RFID tag, for example, in order to couple sufficient energy into the RFID tag so that communication can be initiated.

The contactless circuit arrangement 100 is already tuned to an electromagnetic frequency temporally before communication is initiated between the contactless circuit arrangement 100 and the communication unit 118. The permanent energy storage 106 supplies the antenna tuning circuit 104 with energy by means of the energy supply interface 112 independently of an external energy supply. On account of this energy supply, an item of control information contained in the memory 110 is converted into a configuration of the plurality of electrical components 114 which can be connected and disconnected in the antenna tuning circuit 104.

For an exemplary situation, a passive RFID tag as described above and the contactless circuit arrangement 100 have incorrect tuning. If first communication is now initiated by means of a communication unit 118, energy is coupled into the passive RFID tag and the contactless circuit arrangement 100 to a reduced extent. The communication unit 118 must be brought close enough to the conventional contactless circuit arrangement, for example, so that sufficient energy for operating the RFID circuit of the contactless circuit arrangement 100 or sufficient energy for operating the passive RFID tag is coupled in. Assuming that sufficient energy is coupled in, both the passive RFID tag and the contactless circuit arrangement 100 are set up in this example to correct incorrect tuning. In the case of the contactless circuit arrangement 100, this correction can be written to the memory 110 as new control information and can be implemented as a new configuration of the plurality of electrical components 114 which can be connected and disconnected.

If the first communication is now concluded and second communication is initiated, the passive RFID tag will continue to couple in energy to a reduced extent initially during the second initiation on account of the incorrect tuning. That is to say, the communication unit must be brought close enough to the conventional contactless circuit arrangement, for example, so that sufficient energy is coupled in so that the passive RFID tag can correct the incorrect tuning. In contrast to this, there is no longer any incorrect tuning in the contactless circuit arrangement 100 on account of the new configuration of the plurality of electrical components 114 which can be connected and disconnected and electromagnetic waves or fields can already be coupled in without reduction when initiating communication.

Depending on the embodiment, passive RFID tags described above can store intended corrections of incorrect tuning. However, in contrast to the contactless circuit arrangement 100, these corrections are not permanently present or implemented. That is to say, in this case too, sufficient energy must first of all be coupled in using a possibly incorrectly tuned antenna structure when initiating communication in order to activate circuits which implement such a correction.

Figure 2:
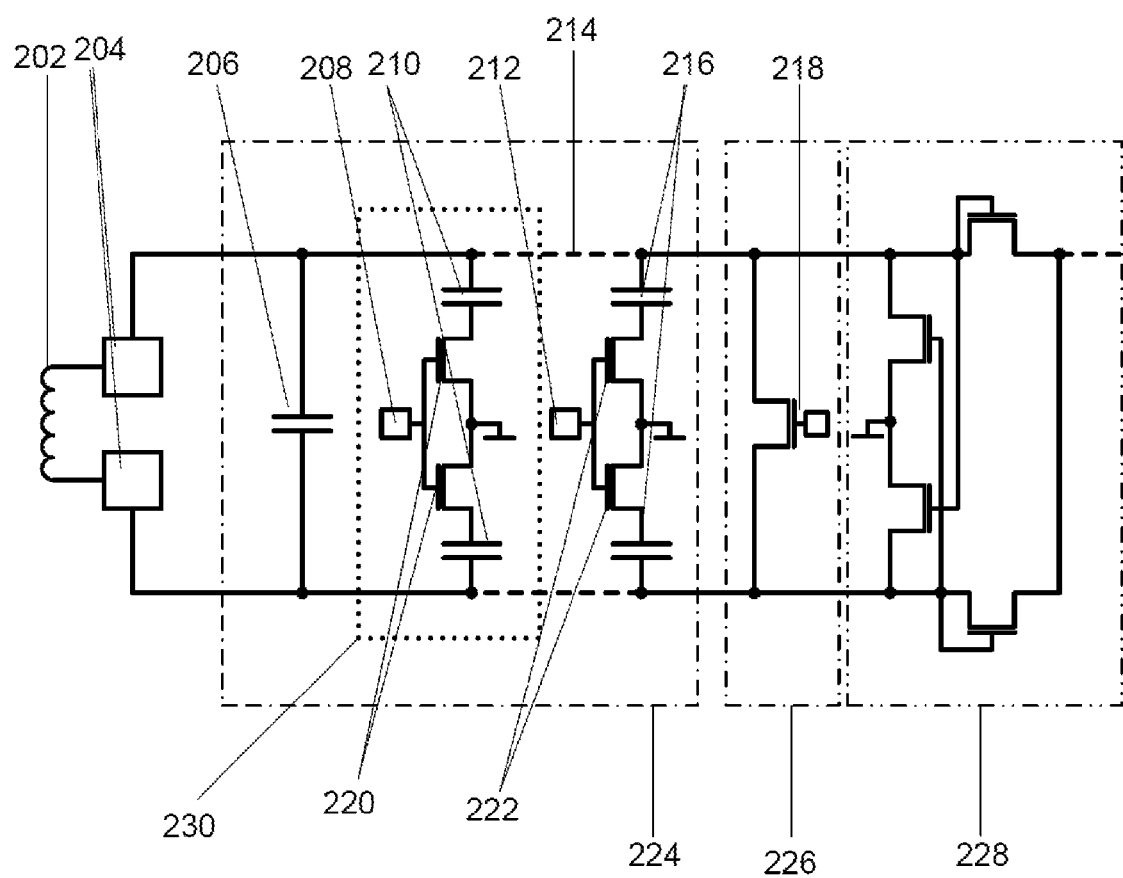
FIG. 2 shows an embodiment of an antenna tuning circuit.

FIG. 2 schematically shows an antenna tuning circuit according to various embodiments.

The antenna tuning circuit 224 is connected to an antenna 202 in an electrically conductive manner by means of inputs and outputs 204. The antenna tuning circuit 224 is also electrically connected to a switch circuit 226 and a rectification circuit 228.

The antenna tuning circuit 224 has a capacitor 206 and the first electrical component 230. The first electrical component 230 has capacitors 210, transistors 220 and a transistor controller 208. Any desired number of electrical components having an identical structure to the first electrical component 230 can be provided in principle. An nth electrical component has capacitors 216, transistors 222 and a transistor controller 212.

The capacitor 206 is connected in parallel with the antenna 202 and influences the target frequency. In different embodiments, the capacitor 206 can be supplemented with a plurality of capacitors connected in parallel and/or in series and/or with electrical resistors. The capacitor 206 may have an adjustable/variable capacitance.

The transistor controller 208 can change the target frequency by switching the transistors 220. The dotted line 214 is intended to illustrate the fact that the antenna tuning circuit 224 can have any desired number of further electrical components (which can have an identical structure to the first electrical component 230 or can also have another suitable structure), for example the nth electrical component.

The switch circuit 226 is connected to the antenna tuning circuit 224 in an electrically conductive manner. The switch circuit 226, which can be used to short-circuit the antenna 202, has the switch controller 218.

The antenna tuning circuit 224 is electrically connected to a rectification circuit 228. As shown in this example, this rectification circuit can be formed using four transistors (for example set up as field effect transistors, for example as metal oxide semiconductor field effect transistors (MOS field effect transistors)).

Figure 3:
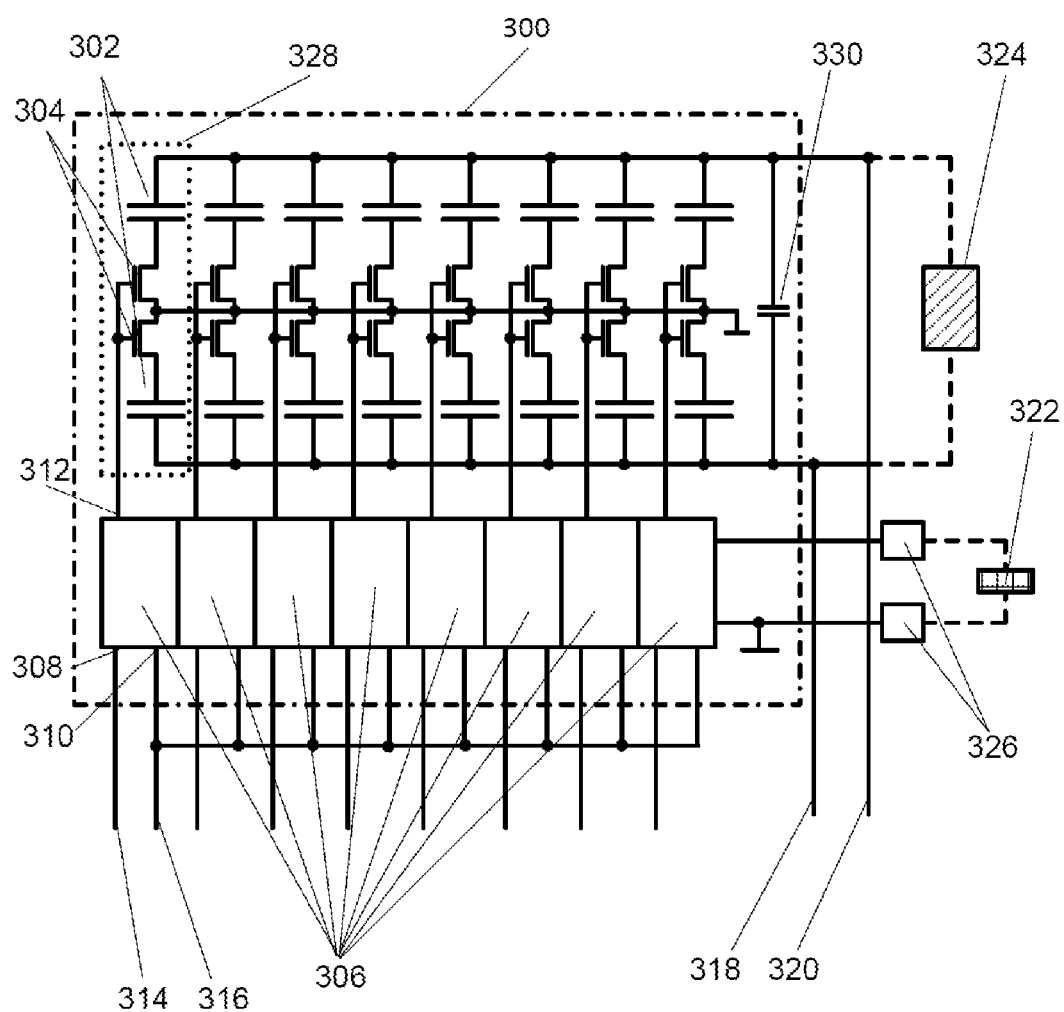
FIG. 3 shows a further embodiment of an antenna tuning circuit.

FIG. 3 schematically shows an antenna tuning circuit 300 according to various embodiments.

The antenna tuning circuit 300 is connected to an antenna 324 in an electrically conductive manner. The antenna tuning circuit 300 is also connected to an energy supply interface 326 in an electrically conductive manner. The antenna tuning circuit 300 is connected to a permanent energy storage 322 in an electrically conductive manner by means of the energy supply interface 326.

The antenna tuning circuit 300 has a first electrical component 328, a capacitor 330 and flip-flops (for example D-type flip-flops) 306. The electrical component 328 has capacitors 302 and transistors 304, for example. A first (the first from the left-hand side in the sense of FIG. 3) D-type flip-flop 306 has an input 308 and an output 310. Electrical connections 318 and 320 connect the antenna tuning circuit 300 to an RFID communication circuit 102 (not shown).

The capacitor 330 influences the target frequency in a similar manner to the capacitor 206 in FIG. 2.

The D-type flip-flops 306 (also referred to as "D latch") control the transistors 304. The electrical state of the D-type flip-flops 306 corresponds to an item of control information, for example. For the sake of clarity, only one of the electrical components 328 was provided with a reference symbol. For the purpose of clarity, the respective input and output of the D-type flip-flops 306 are likewise provided with reference symbols only for the first D-type flip-flop 306.

As an example, the coupling structure of the first D-type flip-flop 306 is explained. It has an output 312 which is used to control the transistors 304. An input 308 (also referred to as a "data input") is connected to an RFID communication circuit 102 (not shown) by means of an electrical connection 314. The first D-type flip-flop 306 also has a further input 310 (also referred to as a "clock input" or "clock") which is connected to the RFID communication circuit 102 (not shown) by means of the electrical connection 316. The first D-type flip-flop 306 is supplied with energy by means of the permanent energy storage 322.

For example, the first D-type flip-flop 306 always has one of two electrical states at a particular time (but it is possible to change over between the two states). Depending on the electrical state of the first D-type flip-flop 306, the transistors 304 are controlled by means of the output 312. The first D-type flip-flop 306 can maintain this respective electrical state by means of the energy supply interface 326 and the permanent energy storage 322 and is therefore a non-volatile memory. Subject to a signal at the clock input 310, the RFID communication circuit 102 (not shown) can produce a new electrical state of the first D-type flip-flop 306 at the data input 308 by means of the electrical connection 314. This new electrical state is produced only if the clock input 310 receives a corresponding signal from the RFID communication circuit 102 (not shown) by means of the electrical connection 316. As is clear from the figure, the RFID communication circuit 102 (not shown), for example, can produce electrical states for all D-type flip-flops 306 by means of the corresponding data inputs 314. The electrical states are assumed only if a corresponding signal is passed to the clock inputs 310 of the corresponding D-type flip-flops 306 on the electrical connection 316.

In this embodiment, one of the eight D-type flip-flops 306 respectively controls one of the electrical components 328. Eight D-type flip-flops 306 can therefore be used to produce a total of $2^8=256$ different configurations.

The electrical connections 318 and 320 are used to transmit energy and/or data to and/or for the RFID communication circuit 102 (not shown).

Various embodiments of a contactless circuit arrangement may have at least one antenna and an antenna tuning circuit having a plurality of electrical components. The contactless circuit arrangement may additionally have an energy supply interface which is connected to the antenna tuning circuit in an electrically conductive manner. The energy supply interface is set up to supply electrical energy for electrically connecting or disconnecting at least one electrical component of the plurality of electrical components for adapting the antenna tuning circuit to a target frequency.

The contactless circuit arrangement may be set up for energy and/or data transmission according to a communication technology, for example an RFID communication technology.

Energy and/or data can be transmitted, for example, using electromagnetic waves and/or electromagnetic fields. Accordingly, the various embodiments should be understood such that both electromagnetic waves and electromagnetic fields can be used for the transmission. For example, energy and data can be transmitted using magnetic induction. Accordingly, the term "electromagnetic frequency" should be understood such that it refers both to electromagnetic waves and to the frequency of a magnetic induction field.

The at least one antenna may be designed for an electromagnetic frequency range, for example using the geometrical shape of electrical conductors. For example, the antenna may be designed as a coil for coupling electromagnetic fields (for example by means of magnetic induction in "proximity" or "NFC" applications) or as a dipole for coupling electromagnetic waves (for example in "long-range" applications).

The antenna tuning circuit may change the resonant frequency of the contactless circuit arrangement, for example, and may therefore tune the contactless circuit arrangement to electromagnetic waves or fields of a target frequency or of a frequency range. In various embodiments, the contactless circuit arrangement may be tuned, for example optimized, to more than one target frequency.

The energy supply interface may be set up to supply energy to the antenna tuning circuit or parts of the antenna tuning circuit, for example electrical components. In various embodiments, the energy supply interface may be set up to supply different electrical components of the antenna tuning circuit, each with different electrical parameters, for example current intensity, voltage and power, with energy. The energy supply interface may also be set up, for example, to forward energy received using the antenna, for example for the purpose of charging an energy storage.

The antenna tuning circuit can be electronically configurable in a reversible manner using the energy provided by means of the energy supply interface. That is to say, the configuration of electrically connected and/or disconnected electrical components can be changed as desired. Depending on the configuration, that is to say which electrical components and how many electrical components have been connected or disconnected, the contactless circuit arrangement can be tuned to a different target frequency. For example, the resonant frequency of the contactless circuit arrangement may be changed or may have been changed.

At least parts of the antenna and/or of the antenna tuning circuit can be integrated as desired and if expedient. Criteria may be, for example, production costs, space requirement and optimization of the antenna tuning circuit.

According to various embodiments, the contactless circuit arrangement may also have a circuit which is set up to be operated with energy received using the antenna.

The antenna and/or the antenna tuning circuit may be at least partially integrated in this circuit, for example monolithically integrated in a semiconductor chip.

According to various embodiments, the circuit which is set up to be operated with energy received using the antenna may be set up as a communication circuit.

For example, the communication circuit can receive and/or transmit data using the antenna tuning circuit and the antenna.

According to various embodiments, the circuit which is set up to be operated with energy received using the antenna may be set up as an RFID communication circuit.

For example, the RFID communication circuit can receive and/or transmit energy and/or data using the antenna tuning circuit and the antenna according to an RFID communication technology.

The RFID communication circuit may be in the form of a passive, active or semi-active/semi-passive RFID communication circuit, for example. That is to say, the RFID communication circuit may not have an energy storage or supplies an energy storage of the at least parts of the RFID communication circuit with energy. The RFID communication circuit may be, for example, an RFID chip or a so-called "Contactless Controller". The RFID communication circuit may be in the form of a near field communication circuit. Depending on the design of the RFID communication circuit or depending on the underlying RFID communication technology, the antenna, for example, may have a different structure, for example may be respectively designed for a different target frequency.

According to various embodiments, the antenna tuning circuit may have a memory. The memory may be set up to store an item of control information for electrically connecting or disconnecting at least one electrical component of the plurality of electrical components.

The memory may have one or more analogue or digital circuits, for example. The memory may also be set up, for example, to store a plurality of items of control information for controlling the antenna tuning circuit. The memory may be designed in such a manner that it can only be read or in such a manner that it can both be read and written to. The memory may also have one part which can only be read and a further part which can be read and written to. The control information can be converted into a configuration of connected and/or disconnected electrical components using the antenna tuning circuit.

According to various embodiments, the memory may be set up as a non-volatile memory.

The memory may store data, for example one or more items of control information, using energy provided by means of the energy supply interface, for example; in other words, the memory can have the data written to it using the energy.

According to various embodiments, the memory may have at least one flip-flop.

For example, the one or more flip-flops may be in the form of RS-type, D-type, JK-type or T-type flip-flops. Depending on the embodiment, a flip-flop may be, for example, a simple circuit, that is to say a circuit comprising a few cost-effective components, and a comparatively energy-saving circuit. The memory may consist entirely of flip-flops or may have flip-flops in addition to other electrical memory components.

According to various embodiments, the contactless circuit arrangement may also have a circuit which is coupled to the memory and is set up to be operated with energy received using the antenna. The circuit coupled to the memory may be set up to write one or more items of control information to the memory.

For example, the circuit coupled to the memory may be an RFID communication circuit. The RFID communication circuit may change the control information stored in the memory in such a manner that the contactless circuit arrangement is tuned to a different (predefined) target frequency using the antenna tuning circuit. The circuit coupled to the memory may be set up, for example, for fine tuning using the antenna tuning circuit.

In various embodiments, the circuit coupled to the memory may be set up to test different configurations of connected and disconnected electrical components and to transfer the optimum configuration, that is to say the configuration best tuned to a target frequency, to the memory as control information.

The circuit coupled to the memory may also contain stored standard control information, for example for the situation in which the contactless circuit arrangement is operated for the first time or an energy supply for the memory was interrupted. The stored standard control information may be used as a presetting or as a starting point for optimization.

According to various embodiments, the plurality of electrical components may have one or more capacitors.

The capacitors may be used to set the target frequency of the contactless circuit arrangement. Changing the configuration of connected or disconnected capacitors makes it possible to change the target frequency of the contactless circuit arrangement. The capacitors which can be connected and disconnected, for example, can be connected and/or disconnected in pairs or as groups according to various embodiments. For example, capacitors or capacitor pairs or capacitor groups connected in parallel and/or in series can be connected and/or disconnected as desired. The control information (also referred to as configuration information) relating to which capacitors (or pairs or groups) have been connected and/or disconnected can be stored as a binary value, for example. The antenna tuning circuit may additionally also have one or more capacitors which cannot be connected or disconnected.

According to various embodiments, the plurality of electrical components may have a plurality of capacitors, each capacitor of the plurality of capacitors each having a constant capacitance.

In the case of a capacitor having an adjustable capacitance, there is the risk that the adjustment of the capacitance of the capacitor (and therefore the capacitance of the capacitor) can change on account of environmental influences. This can be avoided using capacitors having a constant capacitance.

According to various embodiments, the contactless circuit arrangement may also have a rectification circuit which is coupled to the at least one electrical component.

A rectification circuit may be integrated, for example, in the antenna tuning circuit or may be electrically connected to the latter. It may be used to rectify electrical current and voltage signals. The rectification circuit may make the rectified current and voltage signals available to other circuits of the contactless circuit arrangement.

According to various embodiments, the contactless circuit arrangement may also have a switch which is coupled to the antenna in such a manner that it short-circuits the antenna in a switch position.

The switch may influence the target frequency of the contactless circuit arrangement, for example, by virtue of the electrical current flow in the antenna tuning circuit respectively being different depending on the switch position.

In a similar manner to an item of control information relating to the configuration of electrical components which can be connected and disconnected, the information relating to a switch position can be stored in a memory.

According to various embodiments, the target frequency may be a frequency in a range of approximately 10 MHz±1 MHz.

The target frequency may correspond to a predefined frequency of a communication technology. Examples of frequencies and frequency ranges are 10 MHz, 13.56 MHz, 149 MHz, 401 to 406 MHz, 430 to 440 MHz, 863 to 870 MHz and 2.4 GHz.

According to various embodiments, the contactless circuit arrangement may also have a permanent energy storage which is connected to the energy supply interface in an electrically conductive manner.

According to various embodiments, the permanent energy storage may be a battery, for example a thin-film battery, or a rechargeable battery.

The configuration of the electrical components which can be connected and disconnected can be permanently retained, for example, by means of an energy supply using the permanent energy storage and may be independent of an energy supply according to an RFID communication technology, for example.

According to various embodiments, the permanent energy storage may be a rechargeable energy storage.

A rechargeable energy storage may be charged, for example, by means of energy which can be received using the antenna according to an RFID communication technology. For example, excess energy which is not needed to operate the contactless circuit arrangement can be used for recharging. The energy supply interface can be accordingly set up for this purpose. For example, overheating of the contactless circuit arrangement can thus be avoided or prevented since excess energy is stored, for example, and is not converted into heat on account of the electrical resistance of the contactless circuit arrangement.

According to one exemplary embodiment, an item of control information can be stored in the memory. This control information can be converted into a configuration of the electrical components which can be connected and disconnected, for example by means of transistors, using the antenna tuning circuit. The electrical components which can be connected and disconnected have capacitors. On account of the configuration of the electrical components which can be connected and disconnected, the contactless circuit arrangement is tuned to a target frequency of 13.56 MHz. The antenna tuning circuit is electrically connected to the energy supply interface. The energy supply interface is electrically connected to a permanent energy storage in such a manner that the antenna tuning circuit is supplied with energy by means of the permanent energy storage. The configuration of the electrical components which can be connected and disconnected and the memory state of the memory are maintained by means of the energy supply using the permanent energy storage. The permanent energy storage is in the form of a thin-film battery. The contactless circuit arrangement has an RFID communication circuit. The RFID communication circuit is set up to receive and/or transmit data and/or energy according to an RFID communication technology using the antenna and the antenna tuning circuit.

The contactless circuit arrangement is therefore already tuned to the target frequency temporally before communication between a reader according to an RFID communication technology and the contactless circuit arrangement, for example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A contactless circuit arrangement, comprising:
   at least one antenna;
   an antenna tuning circuit having a plurality of electrical components; wherein the antenna tuning circuit further comprises one or more flip-flops configured to control the plurality of electrical components;
   an energy supply interface which is connected to the antenna tuning circuit in an electrically conductive manner and is configured to supply electrical energy for electrically connecting or disconnecting at least one electrical component of the plurality of electrical components for adapting the antenna tuning circuit to a target frequency;
   wherein the energy supply interface supplies electrical energy independently from the at least one antenna.

2. The contactless circuit arrangement of claim 1, further comprising:
   a circuit which is set up to be operated with energy received using the antenna.

3. The contactless circuit arrangement of claim 2,
   wherein the circuit is set up as a communication circuit.

4. The contactless circuit arrangement of claim 3,
   wherein the communication circuit is set up as an radio frequency identification (RFID) communication circuit.

5. The contactless circuit arrangement of claim 1,
   wherein the antenna tuning circuit comprises a memory configured to store an item of control information for electrically connecting or disconnecting at least one electrical component of the plurality of electrical components.

6. The contactless circuit arrangement of claim 5,
   wherein the memory is set up as a non-volatile memory.

7. The contactless circuit arrangement of claim 5, further comprising:
   a circuit which is coupled to the memory and is set up to be operated with energy received using the antenna;
   wherein the circuit is set up to write the control information to the memory.

8. The contactless circuit arrangement of claim 1,
   wherein the plurality of electrical components comprise one or more capacitors.

9. The contactless circuit arrangement of claim 8,
wherein the plurality of electrical components comprise a plurality of capacitors;
wherein the plurality of capacitors each comprises a constant capacitance.

10. The contactless circuit arrangement of claim 1, further comprising:
a rectification circuit which is coupled to the at least one electrical component.

11. The contactless circuit arrangement of claim 1, further comprising:
a switch which is coupled to the antenna in such a manner that the switch short-circuits the antenna in a switch position.

12. The contactless circuit arrangement of claim 1,
wherein the target frequency is a frequency in a range of approximately 13.56 MHz ±1 MHz.

13. The contactless circuit arrangement of claim 1, further comprising:
a permanent energy storage which is connected to the energy supply interface in an electrically conductive manner.

14. The contactless circuit arrangement of claim 13,
wherein the permanent energy storage is a rechargeable energy storage.

15. A contactless circuit arrangement, comprising:
one or more antennas;
an antenna tuning circuit comprising a plurality of electrical components; wherein the antenna tuning circuit further comprises one or more flip-flops configured to control the plurality of electrical components; and
an energy supply interface electrically conductively coupled to the antenna tuning circuit, wherein the energy supply interface is configured to supply electrical energy to electrically connect or disconnect at least one of the plurality of electrical components to adapt the antenna tuning circuit to a predefined target frequency; wherein the energy supply interface supplies electrical energy independently from the at least one antenna.

16. The contactless circuit arrangement of claim 15, further comprising:
a circuit which configured to be operated with energy received using the one or more antennas.

17. The contactless circuit arrangement of claim 15,
wherein the antenna tuning circuit comprises a memory configured to store control information to electrically connect or disconnect at least one electrical component of the plurality of electrical components.

18. The contactless circuit arrangement of claim 17, further comprising:
a circuit coupled to the memory and configured to be operated with energy received using the one or more antennas;
wherein the circuit is configured to write the control information to the memory.

19. The contactless circuit arrangement of claim 15,
wherein the plurality of electrical components comprise one or more capacitors.

* * * * *